Nov. 10, 1970  T. G. TUFO  3,539,454
EVAPORATION-CONDENSATION RECOVERY OF FRESH WATER
USING GAS-TRAVERSABLE POROUS BED
Filed Aug. 30, 1968
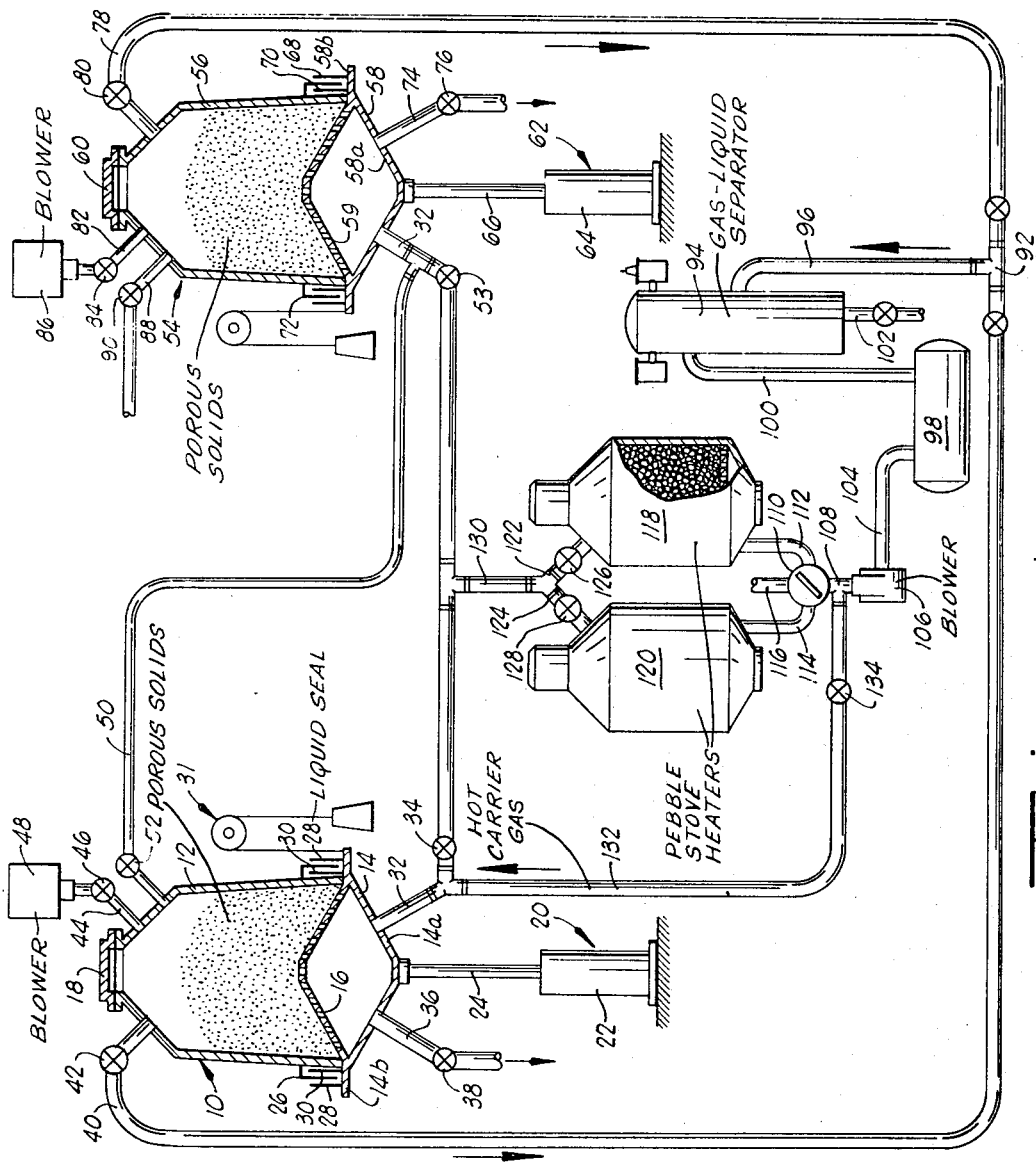
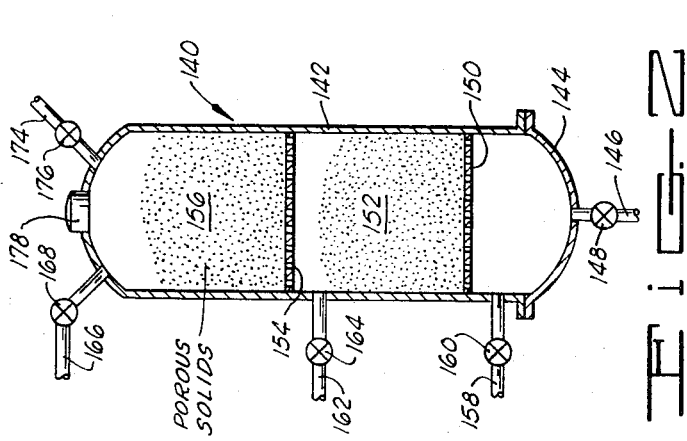
INVENTOR.
THOMAS G. TUFO
BY
Dunlap, Laney & Hessin
ATTORNEYS

United States Patent Office

3,539,454
Patented Nov. 10, 1970

3,539,454
EVAPORATION-CONDENSATION RECOVERY OF FRESH WATER USING GAS-TRAVERSABLE POROUS BED
Thomas G. Tufo, 109 Page, Norman, Okla. 73066
Filed Aug. 30, 1968, Ser. No. 756,589
Int. Cl. B01d 1/14; C02b 1/00, 1/06
U.S. Cl. 203—11
11 Claims

ABSTRACT OF THE DISCLOSURE

A method of separating a liquid from solids where both are present as a solution, mixture, suspension or colloidal dispersion, by directing a heated carrier gas into contact with the liquid-solids containing system while it is dispersed in and upon a gas-traversable solid substrate. The heated gas is introduced to the substrate at temperature, pressure and flow conditions such that, at its point of initial contact with the liquid-solids system, the liquid is at least partially vaporized and entrained in the carrier gas, and at the same point further removed along the flow path of the carrier gas through the substrate, the entrained vapor is at least partially condensed in the form of liquid droplets small enough to be entrained in the carrier gas. The carrier gas is then passed from the substrate to a collection zone where the entrained liquid droplets are recovered therefrom.

BACKGROUND OF THE INVENTION

Field of the invention

This invention relates to materials separation and purification, and more specifically, to the recovery of a liquid or liquids from dissolved and admixed solids which remain in a condensed phase under conditions of temperature and pressure at which the liquid is vaporized. In a specific, though nonlimiting, aspect, the invention relates to a process and apparatus which can be successfully and efficiently utilized to recover fresh water from saline aqueous solutions, such as brackish waters and sea water.

Brief description of the prior art

Various processes are in commercial use for separating solutions or mixtures into liquid and solid phases derived from the constituents of the solution or mixture. One of the most widely used of these procedures, yet one which is continually under investigation and improvement, is distillation. This technique finds an important application in the large scale recovery of relatively pure water from brackish water or sea water. It is recognized, however, that conventional distillation of sea water is not competitive economically, as a source of fresh water, with other fresh water sources currently available in most geographic locations. Moreover, the distillation method of sea water desalination is most attractive in comparison to other methods of desalination where very cheap power (such as may be derived from nuclear reactors) is available, and a very large capacity plant can be constructed and utilized. Where limited production capacity can be tolerated, and power is less readily and economically available, other methods of desalination, such as reverse osmosis, electrolysis and exchange crystallization presently appear to offer significant advantages over distillation.

Because of the large capacity usually characteristic of sea water distillation facilities, capital investment is necessarily large and, in some cases, becomes prohibitive. Power consumption in operating such plants is also quite high and is costly, especially when nonnuclear sources are employed. There is therefore a continuing effort to improve the efficiency of such distillation facilities, to reduce the power requirements, and to reduce the cost of constructing such facilities by eliminating or simplifying heat exchange units, condensers, stills and associated equipment.

BRIEF DESCRIPTION OF THE PRESENT INVENTION

The present invention provides a distillation method and apparatus for quickly and efficiently separating a liquid from a solid with which it may be mixed as a solution or suspension. In an especially useful application of the invention, the process can be utilized to recover relatively pure water from saline aqueous solutions, such as sea water, at a lower capital investment and operating cost than typical of conventional distillation procedures. In another application of the invention, the process and apparatus may be utilized for treating sewage to recover useful and, in some instances, potable, water from the raw sewage, leaving a dry, combustible residual material which may be used as a fuel, as a fertilizer or in other applications.

Broadly described, the process of the invention comprises initially adsorbing a solution, or a mixture of liquid and solid or solids to be separated, on the surface of a solid substrate material. A heated, inert carrier gas is then directed across the surface after the carrier gas has been heated to a temperature which is sufficient, considering its velocity across the surface and the pressure prevailing at the surface, to vaporize the liquid where the gas first contacts it. The geometry and physical size of the substrate material are such that, as the carrier gas continues its traversal of the solution-carrying surface, it loses heat until its temperature is sufficiently low that a condensation of the previously vaporized liquid component which is entrained in the carrier gas occurs. By properly controlling the flow velocity of the carrier gas, the entrained vapors of the solvent from the solution, or liquid from the mixture, can be made to condense to small droplets which can be swept out of the substrate zone in the flowing carrier gas, leaving the solid solute in place on the surface of the substrate. The carrier gas and entrained droplets of the liquid component of the solution or mixture subjected to the process are finally directed to a separation zone where known techniques and apparatus are utilized for recovering the droplets from the carrier gas.

As may be inferred from the foregoing brief description of the invention, a thermal gradient is established across the surface or surfaces of the substrate traversed by the carrier gas and what may be described as a thermal wave is developed. In the leading portion of this wave, a relatively low temperature prevails at which the described condensation may occur, with such temperature being induced by the relatively low temperature which is characteristic of the substrate material and the solution or mixture carried thereon at the outset of the process. In the trailing portion of the wave, temperatures prevail which are sufficiently high to vaporize the liquid on the substrate, though not sufficiently high to convert the solute or solid phase to a vapor phase.

The apparatus of the invention in which the described process is carried out includes a chamber, a porous substrate material within the chamber for supporting the solution or mixture from which a liquid is to be separated, means for charging a heated, inert carrier gas to the chamber for transmission through the substrate material, means for discharging carrier gas from the chamber after it has traversed the porous substrate, and means for removing droplets of entrained liquid from the carrier gas after it has been discharged from the chamber. In a preferred embodiment of the invention, a plurality of the chambers are provided and are interconnected by conduits and valves permitting the carrier gas to be recirculated and passed though the chambers in series during one portion of the process, and through the chambers simultaneously in series and in parallel at another time during the process.

From the foregoing brief description of the invention, it will have become apparent that it is a major object of the invention to provide an improved distillation process which can be used to more economically separate liquids from solids in a solution or a mixture of these materials.

Another object of the invention is to provide a process for the reduction of the concentration of dissolved minerals and salts in a water solution thereof, such as sea water and brackish water, in a manner which facilitates the subsequent recovery of the extracted minerals and salts.

An additional object of the invention is to provide a process and apparatus for separating liquids from solids suspended or dissolved in the liquid to form mixtures, solution or supension which do not undergo pyrolitic decomposition, and in which the liquid component has a lower boiling point than the solids.

A further object of the invention is to provide a distillation process which is more economical in practice than previously employed methods of distillation due to a reduction in the need for peripheral, independently operated heat exchange units.

An additional object of the invention is to provide a method for recovering fresh, relatively pure water from saline aqueous solutions by an improved distillation procedure.

Another object of the invention is to provide a relatively inexpensive apparatus which can be employed for conducting in a single chamber, a distillation process in which a liquid is separated from a contaminant by distillation and is then condensed as the vapor thus generated is passed through or across a substrate material which supports the liquid and contaminant.

Yet another object of the invention is to provide a distillation process in which heat losses are reduced as compared to previously employed distillation processes.

Another object of the invention is to provide a method and apparatus for treating raw sewage to recover therefrom relatively pure water and a useful solid product.

Other objects and advantages of the invention will become apparent as the following detailed description of the invention is read in conjunction with the accompanying drawing which illustrates the apparatus used in practicing the process of the invention.

BRIEF DESCRIPTION OF THE DRAWINGS

FIG. 1 is a flow diagram—partly sectional and partly elevational view of one embodiment of apparatus used in the process of the invention.

FIG. 2 is a sectional view of a modified retort-condenser chamber which can be employed in practicing the process of the invention.

DETAILED DESCRIPTION OF A PREFERRED EMBODIMENT OF THE INVENTION

One embodiment of apparatus in which the process of the invention may be carried out is depicted in FIG. 1 of the drawings. A closed system is preferably used in the performance of the process and includes a chamber 10 which functions both as retort (or still) and as a condenser as will be hereinafter explained. In the illustrated embodiment of the invention, the chamber 10 is basically frusto-conical in configuration, with the larger diameter portion of the chamber being toward the bottom. The chamber 10 includes an upper portion 12 and a lower portion 14 which can be detached from the upper portion. The lower portion 14 forms the bottom of the chamber 10 and includes a lower wall 14a having a radially outwardly extending annular flange 14b secured around the upper edge thereof. A perforate grate or screen 16 which is of frusto-conical configuration is extended between the upper edges of the lower wall 14a, and projects upwardly into the upper portion 12 of the chamber 10. The top of the upper portion 12 of the chamber 10 is closed by a cover plate 18 which can be removed when the chamber 10 is to be filled with a porous substrate material of the type hereinafter described. The cover plate 18 can be hingedly secured to the upper portion 12 of the chamber, or it can be entirely detachable therefrom, provided only that rapid and easy access to the interior of the chamber can be had through the opening which it covers.

A hydraulic piston and cylinder assembly 20 which includes a cylinder 22 and piston 24 is secured to the center of the lower wall 14a of the chamber 10 for lifting the lower portion 14 into operative position. The upper portion 12 of the chamber 10 carries a downwardly depending annular flange 26 which, when the lower portion 14 is elevated by the piston and cylinder assembly 20 to the position illustrated, forms a water seal interlock channel with a pair of cooperating, upwardly extending annular flanges 28 and 30 secured to the radially outwardly projecting annular flange 14b. A suitable counterweight and pulley assembly 31 is secured to the flange 14b to aid the piston and cylinder assembly 20 in raising the lower portion 14 of the chamber 10 periodically for purposes hereinafter described.

Secured to the lower wall 14a of the lower portion 14 of the chamber 10, and communicating with the space between this wall and the grate 16 is a carrier gas charging conduit 32. The charging conduit 32 carries a control valve 34 and is connected to the lower portion 14 of the chamber 10 in a manner which does not interfere with the periodic raising and lowering of this portion of the chamber. Interference with such movement of the lower portion 14 of the chamber 10 by the charging conduit 32 may be avoided by making a portion of the conduit flexible, or by providing for quick detachability of the connecting fittings which will permit the conduit to be detached and moved out of the way of the up and down reciprocating movement of the lower portion 14 of the chamber 10. Also secured to the lower wall 14a of the lower portion 14 of the chamber 10 is a drain pipe 36 which carries a stop cock 38.

Extending into the upper portion 12 of the retort-condenser chamber 10 at locations spaced downwardly from the cover plate 18 are a plurality of fluid conduits, including a main carrier gas effluent conduit 40 containing a control valve 42, a purge gas conduit 44 containing a control valve 46 and connected to a blower 48, and a secondary effluent conduit 50. The secondary effluent conduit 50 communicates with the upper end of the chamber 10 and has interposed therein a control valve 52. At its end opposite that end which communicates with the interior of the chamber 10, the secondary effluent conduit 50 is connected to a branch of the carrier gas charging conduit 32 at a point between a control valve 53 in this conduit and a secondary retort-condenser chamber 54.

The secondary retort-condenser chamber 54 is constructed substantially identical to the retort-condenser chamber 10 hereinbefore described, and thus includes an upper portion 56 and a lower portion 58 having a lower wall 58a which terminates at its upper end in an annular, radially outwardly extending flange 58b. The upper portion 56 is closed by a removable cover plate 60, and the lower portion 58 of the chamber 54 is raised into operative position by means of a piston and cylinder assembly 62. The piston and cylinder assembly includes a cylinder 64 and a piston 66 which is extended and retracted to raise and lower the lower portion 58 of the secondary retort-condenser chamber 54. Projecting upwardly from the annular, radially outwardly extending flange 58b are a pair of spaced, annular water seal flanges 68 and 70, and these flanges cooperate with a downwardly depending interfitting annular flange 72 which is secured to the sidewall of the upper portion 56 of the chamber 54.

Essentially the same conduit connections are made to the secondary retort-condenser chamber 54 as have been described in referring to the retort-condenser chamber 10. Thus, in addition to the connection to the lower wall 58a thereof of the carrier gas charging conduit 32, the lower wall also has secured thereto, and communicating with the space inside the chamber 54, a drain pipe 74 which carries a stop cock 76. Entering the upper end of the secondary retort-condenser 54 are a main carrier gas effluent conduit 78 containing a control valve 80, a purge gas conduit 82 containing a control valve 84 and connected to a blower 86, and a secondary effluent conduit 88 containing a control valve 90. It may be remarked at this point that the retort-condenser chambers 10 and 54 are constructed quite similarly to those which are depicted in Royster U.S. Pat. 2,705,697, although the conduit connections to the retort-condenser chambers of the present invention are quite different, and the process which is carried out in the chambers also differs, from those which are disclosed in the Royster patent.

Contained within each of the retort-condenser chambers 10 and 54, and resting upon the grates 16 and 59, respectively, disposed in the lower end portions of each chamber, is a bed of porous material capable of adsorbing a solution or suspension which is to be subjected to the distillation process of the present invention. The porous material may be any of a variety of substances, and may be in many different physical forms, provided that it provides a gas traversable structure or bed, and that its particle size, interstitial volume, specific heat and thermal conductivity are suitable for use in the process hereinafter to be described. The porous material located in the chambers 10 and 54 is preferably inert with respect to the carrier gas employed in the process, nonvolatile, nonsublimable, and characterized in having an enlarged surface area upon which the solution to be subjected to the process may be adsorbed. A suitable porous material for placement in the chambers 10 and 54 is carbon dust which has been specially processed to form a porous cake as hereinafter described. For sufficiently low operating temperatures, tightly bound cotton balls may also be employed, and natural hulls or shells of suitable composition, dimension and shape can sometimes be effectively employed. In addition to porosity inherent in the mass itself, the necessary porosity may also be obtained as a result of the physical characteristics or geometry of separate articles placed within the chambers 10 and 54, such as a collection of stacked thimbles or inverted cup-shaped objects. In any case, the primary considerations are that the bed be nonvolatile at the temperatures utilized in the process, nonreactive with the carrier gas, porous enough to permit the carrier gas to traverse the bed, and that it offers a sufficient exposed surface area to permit adsorption of the solution to be processed.

In referring further to the embodiment of the apparatus of the invention depicted in FIG. 1 of the drawings, it may be perceived that the main carrier gas effluent discharge conduits 40 and 78 from the retort condenser chambers 10 and 54, respectively, are interconnected through a T-fitting 92 to a suitable liquid recovery device 94 by means of a conduit 96. Any type of precipitator, condenser or other device capable of removing very small entrained droplets of the liquid to be separated from a moving gas stream may be utilized as the device 94, the function of which will be explained in greater detail hereinafter. A carrier gas reservoir 98 is connected to the liquid recovery device 94 by a gas conduit 100, and a liquid discharge line 102 extends from the bottom of the liquid recovery device 94 to any suitable storage facility which can be used to store liquid products of the process of the invention.

From the reservoir 98, carrier gas accumulated therein is withdrawn through the conduit 104 by a suitable blower 106. The blower 106 forces the carrier gas through a duct or conduit 108 to a four-way reversing valve 110. The four-way reversing valve 110 is connected to carrier gas feed lines 112 and 114 and also to a flue pipe 116. The carrier gas feed line 112 is used for directing carrier gas from the blower 106 into a suitable heating assembly which, in the illustrated embodiment of the invention, is a pair of pebble stoves of the type depicted and described in Royster U.S. Pat. 2,705,697. Pebble stoves of this type are frequently operated in pairs, with one of the stoves being on stream with respect to the carrier gas while the other is being fired preparatory to replacing the on stream stove at a later time during the process.

Extending from the top of the pebble stoves 118 and 120 are a pair of carrier gas vent lines 122 and 124 which contain control valves 126 and 128, respectively, and which merge in the carrier gas charging duct 130. The carrier gas charging duct 130 is connected to the carrier gas charging conduit 32 at a point between the valves 34 and 53. For a purpose to be hereinafter explained, a cold carrier gas recirculation conduit 132 is connected to the carrier gas charging conduit 32 between the control valve 34 and the first retort-condenser chamber 10. The other end of the recirculation conduit 132 is connected to the conduit 108 between the four-way diverting valve 110 and the blower 106. A control valve 134 is interposed in the cold carrier gas recirculation conduit 132.

OPERATION

The process of the invention, as it may be carried out in the embodiment of the apparatus illustrated in FIG. 1, is commenced by first setting the various valves in the conduits which are connected to, and communicate with the interior of, the retort-condenser chamber 10. Along with proper setting of these valves, the process is readied by opening the cover plate 18 on the chamber 10, and filling the chamber to about the level illustrated with the porous substrate material hereinbefore described. The porous substrate material may have been prewetted with the solution which is subjected to the distillation process of the invention, or such solution may be poured into the porous substrate material after it has been located in the chamber 10 by way of the opening at the upper end of the chamber while the cover plate 18 is removed.

An especially useful application of the process of the invention, as has been mentioned, is in the recovery of relatively pure water from saline aqueous solutions, such as sea water and brackish waters. The process will therefore be described as it may be typically utilized in this manner, though its advantages are, of course, realized in many other uses, such as the sewage treatment application previously mentioned.

As has been previously indicated, a porous material which has been found useful in the process of the present invention is carbon dust which has been specially processed to provide a porous bed located in the chamber 10.

The carbon dust particles are prepared by first wetting the charcoal briquettes, then steaming the briquettes until they can be pulverized rapidly and easily. The particulate carbon particles are then dried, and two measures of clear Karo syrup are added to the particles. This mixture is then poured into a suitable receptacle and heated in an oxygen-free controlled atmosphere to 450° F. for from 2.5 to 3.5 hours until a hard, porous carbon cake results. This cake will readily retain a large volume of water adsorbed on the surface of the carbon particles, but does not break up upon being placed wet into an oven which has been preheated to 500° F. The carbon cake is hard and is resistant to fracturing upon being subjected to compression. When this cake has been crushed or disintegrated, the small lumps which result can be used as the porous substrate material in the chamber 10. Other porous substrate materials can, of course, also be employed.

When the porous carbon lumps have been located in the first retort-condenser chamber 10, sufficient sea water is introduced through the opening in the upper end of the chamber to thoroughly soak the lumps of carbon particles. The cover plate 18 is then replaced to form a gas tight seal across the opening at the upper end of the chamber 10, and a suitable inert purging gas, which may be air, nitrogen, or any other suitable inert gas is blown through the bed of carbon particles from the blower 48 by opening the valve 46. At the time of purging the bed with gas passed therethrough by the blower 48, the valves 34, 42, 52 and 134 are closed, and the stop cock 38 in the drain pipe 36 is opened. The purpose of purging the bed of porous particles is to rid the bed of excess drops of sea water which would otherwise drip off the bed and into the moving carrier gas utilized later in the process to achieve distillation of the water, and its recovery in relatively pure form. In other words, it is desirable to first purge the bed to remove excess water in order to avoid contamination of the product water ultimately yielded. With some types of porous bed structures, and by the use of some methods for charging the bed with the raw solution or suspension to be subjected to the process of the invention, the purging step will not be required.

After purging the bed of porous material in the manner described, the blower 48 is stopped and the valve 46 is closed, as is the stop cock 38 in the drain pipe 36. Valves 34 and 42 are then opened. Valves 52 and 53 remain closed. This status of the system permits a hot inert carrier gas to be charged to the chamber 10 from the carrier gas charging conduit 32. The carrier gas is heated in one of the pebble stoves 118 or 120 to a temperature such that the gas, at the velocity at which it traverses the porous bed in the chamber 10, will vaporize water adhered to those particles in the bed adjacent the grate 16 and therefore initially contacted by the heated carrier gas. It should also be pointed out that the carrier gas is preferably heated to a temperature below that at which any undesirable side reactions with the material of which the porous bed is constructed may occur. Although some side reactions with the components of this material can be tolerated, these side reactions are preferably reduced to a minimum or completely avoided.

After the gas enters the lower portion 14 of the chamber 10, and passes through the openings of the grate 16, its temperature and velocity cause the water to be vaporized and to enter or mingle with the moving carrier gas and be moved further into porous bed. The solute of the sea water, i.e., salt, however, remains on the solid particles of the porous bed and is not entrained in the moving carrier gas. It will be appreciated, of course, that the conditions which dictate the limits to which the carrier gas is heated in a given situation are variable. The nature of the heat source for heating the carrier gas and the thermal stability of the materials to be recovered are important considerations, both in the selection of the carrier gas, and in the temperature to which it is heated.

As the hot carrier gas moves through the interstices of the porous material in the retort-condenser chamber 10, a thermal wave is developed which progresses in the direction of the path of movement of the carrier gas through the porous material. The thermal wave which characterizes the moving carrier gas is of the type which is described in Royster U.S. Pat. 2,705,697. In the thermal wave moving through the porous material, large thermal gradients are established across the wave front with a relatively high temperature being characteristic of that portion of the wave which is relatively near to the grate 16, and the relatively low temperature, which approaches that of the cold sea water placed on the particulate material at the outset of the process, being characteristic of the leading front of the wave most nearly adjacent the particulate material in the upper portion of the mass.

After the hot carrier gas has been charged to the chamber 10 for a period of time, that portion of the mass of porous material being grater 16 and the beginning of the region of the thermal gradient will be dry, and will be heated to essentially the same temperature as that of the incoming carrier gas. On the other hand, that portion of the mass of porous material between the end of the thermal gradient region of the moving wave and the upper surface of the bed of porous material will be wet to substantially the same extent, and will be at essentially the same temperature, as that of the entire bed and the sea water at the outset of the process.

Within the thermal wave, that is, within the region of thermal gradients from the temperature of the incoming carrier gas down to the lower temperature of the sea water with which the bed of porous material is initially saturated, vaporization will occur at the trailing portion of the wave as hereinbefore described, for the temperature in this portion of the wave is sufficiently high to vaporize the water and leave the salt deposited on the surface of, and within, the porous bed. On the other hand, at the leading edge of the wave containing the thermal gradients, condensation of water vapor will occur, for the temperature within this portion of the wave is below 212° F., or at least below the temperature which is required, considering the velocity of the carrier gas, and other conditions at that point, in order to achieve the desired condensation.

If the carrier gas is moved through the bed of porous material at a sufficiently high velocity, water will condense in the leading portion of the thermal wave in the form of micro droplets which are small enough in diameter and mass to be entrained in the flowing gas stream, and carried out of the retort-condenser chamber 10. There is thus discharged from the chamber 10 through the effluent conduit 40 (the control valve 42 being open), cold carrier gas which carries entrained therein, micro droplets of condensate which is, in the case of the desalination application of the inventon, relatively pure water which may be of sufficient purity for potable usage.

The carrier gas with water droplets entrained is directed through the T-fitting 92 and then is directed through the conduit 96 into the liquid recovery device 94. Here, by the use of suitable heat exchange, or by suitable physical filtration procedures, or any other effective method, the water droplets are removed or "knocked out" of the carrier gas stream, and water accumulates in the bottom of the device 94. From this point, it may be removed through the conduit 102 to a suitable storage facility (not shown).

The water droplet free carrier gas is removed from the liquid recovery device 94 through the conduit 100 and passed to the reservoir 98. The reservoir 98 may be any suitable accumulator type device which can maintain a relatively constant volume of clean, "dry" carrier gas for supply to the system via the conduit 104 and blower 106. Except for heating, the carrier gas has thus been prepared for recirculation. It should be pointed out, however, that it is not essential to the practice of the invention that the carrier gas be recovered from the liquid recovery unit 94 and recirculated through the system since, in some instances, air may be employed for the carrier gas, and where very little or no side reaction occurs between the carrier gas and the porous material located in the chamber 10, economics may permit the carrier gas to be vented to the atmosphere, and recirculation to be eliminated.

In the system under discussion, it will be assumed, by way of illustration and example, that it is desirable to recirculate the carrier gas, and this is accomplished by means of the blower 106 which directs purified carrier gas through the conduit 108, and through a reversing valve 110 to one of the pebble stoves 118 or 120. The alternating sequence of use of pebble stoves 118 and 120 in order to permit one of these heating units to be prepared for utilization while the other is on stream is discussed in detail in U.S. Pat. 2,705,697 to Royster. Alternate charging and on stream utilization of twin unit assemblies of this typs is well known to the chemical engineering profession, and it is believed that it will be sufficient at this point to merely note that either of the pebble stoves 118 or 120, or any other siutable high temperature heat exchange device, can be utilized for imparting the necessary thermal energy to the carrier gas.

Although the process of the invention can be carried out using but a single retort-condenser chamber 10, and without recirculation of the carrier gas as hereinbefore described, optimum operation entails the use of a plurality of retort-condenser chambers and, in fact, the most preferred arrangement of apparatus includes three of these chambers for reasons which will be hereinafter described. In the dual chamber operation, the straight through carrier gas recirculation to the retort-condenser chamber 10 is initially carried on as previously described. Where there is a relatively shallow bed of the porous, sea water adsorbing material in the chamber 10, however, or where the temperature gradient has moved upwardly through the bed to the point where there is an insufficient portion of the porous material remaining ahead of (above) the hot trailing edge of the gradient to permit a close approach of the temperature of the product water removed in the carrier gas to the temperature of the water when it is initially placed on the porous material, the temperature of the effluent carrier gas and the product droplets of condensate will begin to rise.

To assure that the progressive vaporization-condensation occurrence upon which the efficacy of the present process depends will continue, the valve 52 is opened and the valve 42 is closed at this time to divert the flow of the carrier gas through the secondary effluent conduit to the carrier gas charging conduit 32 at a point between the control valve 53 and the point where this charging conduit is connected to the lower portion 58 of the second retort-condenser chamber 54. When this diversion of the effluent carrier gas from the chamber 10 is effected, it will be understood that the body of porous material in the chamber 54 has been treated identically to the manner in which the body of porous material in the chamber 10 was treated at the outset of the process, i.e., it has been saturated with cool sea water from which fresh water is to be recovered. It will be further understood that the stop cock 76 in the drain pipe 74 is closed and that the control valves 84 and 90 have also been closed.

As the relatively warm carrier gas from the chamber 10 passes via the conduits 50 and 32 to the second retort-condenser chamber 54, a process generally similar to that which has been described as occurring in the chamber 10 commences to occur in the second retort-condenser chamber. Thus, the carrier gas, which is at some temperature above the temperature of the sea water which saturates the porous material in the chamber 54, enters this bed of porous material through the grate 59. It will heat the adsorbed sea water on the first particles of the porous material which it contacts above the grate 59.

In most instances, enough of the initial heat of the carrier gas will have initially been extracted from this gas by the residual sea water remaining on the bed of porous material in the chamber 10 that it will be necessary to temporarily boost the temperature of the effluent carrier gas diverted from the chamber 10 to the chamber 54 by adding to this stream primarily heated carrier gas from one of the pebble stoves 118 or 120 which is on stream at the time. Thus, a sufficient amount of the primarily heated carrier gas from one of the pebble stoves 118 or 120 would be added to the residual diverted carrier gas passed through the secondary effluent conduit 50 and the carrier gas charging conduit 32 to the chamber 54 to bring the temperature of the total carrier gas stream entering the chamber 54 to a level such that the water adsorbed on the particles of porous material in this chamber will be vaporized, and will enter the flowing carrier gas to move on through the bed of porous material in this chamber.

It is further usually necessary to add the hot primarily heated carrier gas to the effluent carrier gas diverted from the retort-condenser chamber 10 to the chamber 54 in order to insure that the water carried into the second chamber 54 in this effluent stream is in the form of a vapor. Were the water droplets permitted to enter the chamber 54 in this effluent carrier gas stream, flooding of the second retort-condenser chamber 54 could usually occur. It should be pointed out that though under most conditions of operations, the temperature of the entering carrier gas should be at least about 212° F., under some conditions of pressure and velocity of flow of the carrier gas, stripping and vaporization of the water from the sea water will occur at temperatures lower than this value.

The value of operating the retort-condenser chambers 10 and 54 in series in the manner described, with makeup carrier gas being added to the stream entering the chamber 54, is that this operation permits substantially complete stripping or divestiture of the adsorbed water from the porous material present in the bed within the chamber 10. Were this mode of series operation not possible, the removal of fresh water from the sea water adhered to the particles remaining in the upper portion of the bed of porous material in the chamber 10 could not be as efficiently realized. This is due to the fact that it is necessary to develop in the total mass of sea water-saturated porous material, a temperature gradient sufficient to achieve vaporization and condensation in the described manner within the final portion of this bed of material which is traversed by the carrier gas. Placing the retort-condenser chamber 54 on stream, however, effectively "extends the length" of the bed of porous material being traversed by the carrier gas so that the temperature of the carrier gas and the entrained water vapors can be dropped to a sufficiently low level to effect the previously described condensation of the entrained water vapor and thus produce the micro droplets which are to be subsequently recovered as fresh water.

It should be pointed out that the embodiment of the apparatus of the invention depicted in FIG. 1 is exemplary only, and that other arrangements and designs of valves and bypass lines can be employed, provided only that the assembly permits the carrier gas stream to undergo a temperature transition such that the necessary thermal gradient is established across the beds of porous material in the chambers when they are considered collectively (or as an effective single bed). It should further be pointed out that, with properly designed equipment for recovering of water droplets from the effluent gas stream derived from any chamber containing the saturated bed of porous material, it is not essential in some instances to employ the series operated dual retort-condenser chambers, since the only thing which will occur in this case, provided the collection equipment is capable of condensing the entrained water vapor from the effluent carrier gas stream, is a loss in efficiency toward the end of the process when relatively few of the particles of porous material remain to be stripped of water by the carrier gas directed therethrough, and a loss of the desirable in situ condensation then occurs. One alternative mode of operation which bears mentioning is the possibility of continually adding cool or cold porous substrate material to the top of the bed in a single retort-condenser to achieve the desired temperature drop. This substrate material need not be itself capable of adsorbing the admixture to be subjected to the process, and there may or may not be concurrent removal of substrate material from the bottom of the retort-condenser chamber to maintain a substantially constant volume of substrate material therein.

The effluent carrier gas stream from the chamber 54 leaves the chamber through the conduit 78 and is directed into the liquid recovery device 94 where the water droplets are "knocked out" of the carrier gas, and fresh water is recovered via the conduit 102. The carrier gas is drawn through the conduit 100 to the reservoir 98, and is recycled from this point by means of the blower 106 in the manner previously described.

Operation in the described fashion is continued until all of the particulate porous material in the retort-condenser chamber 10 has been dried. Thus, no more water vapor is being yielded up to the carrier gas directed through this bed, and the bed of material has been heated throughout to a temperature which is essentially the same temperature as the hot incoming carrier gas. At this time, the valve 134 in the cold carrier gas recirculation conduit 132 is opened and the control valve 34 in the carrier gas charging conduit 32 is closed. With this arrangement, cold, dry carrier gas which has been stripped of the product water droplets in the liquid recovery device 94 is directed through the cold carrier gas recirculation conduit 132 at the same time that a second fraction of the recirculated carrier gas is being passed through one of the pebble stoves 118 or 120 for preheating in the manner heretofore described.

Diversion of a portion of the cold dry carrier gas through the recirculation conduit 132 and into the carrier gas charging conduit 32 downstream from the closed valve 34 has the effect of directing this cold carrier gas into the retort-condenser chamber 10. Since the bed of particulate material in this chamber has been heated to the temperature of such gas by the prior passage of hot carrier gas therethrough, the bed of material in this chamber now acts as a preheating instrumentality which serves to preheat that portion of the recirculating cold carrier gas which is diverted therethrough from a point upstream from the pebble stoves 118 and 120. At this time the control valves 42 and 46 and stop cock 38 in the several conduits and pipes leading to the retort-condenser chamber 10 remain closed, so that the cold carrier gas which is heated by passage through the bed of material within this chamber is discharged from the chamber through the secondary effluent conduit 50. It is thus directed into the second retort-condenser chamber 54 in the manner heretofore described.

The second fraction of the cold carrier gas which is derived from the reservoir 98 is directed by the blower 106 through the reversing valve 110 and through the particular one of the pebble stoves 118 or 120 which is, at the time, on stream. Here this second fraction of recirculated carrier gas is heated as previously described, and is directed from the stove into the carrier gas charging conduit 32. With the control valve 34 being closed at this time, this stove-heated portion of the recirculated carrier gas is passed through the control valve 53 and merges with the remaining fraction of recirculated carrier gas in the portion of the carrier gas charging conduit 32 between the control valve 53 and the lower portion 58 of the chamber 54. The proportions or fractions of the cold carrier gas from the reservoir 98 which are directed through the recirculation conduit 132 and through the pebble stove which is on stream are adjusted so that the mixed gas entering the retort-condenser chamber 54 is at the proper temperature to obtain the desired thermal gradient across this bed of porous material.

After passage through the porous bed in chamber 54 to first vaporize adsorbed water, and then permit it to condense in micro droplets as described, the effluent carrier gas stream is passed through the carrier gas effluent conduit 78 to the water recovery device 94 in the manner heretofore described. Operation proceeds in this fashion until all of the bed of the porous material in the first retort-condenser chamber 10 is cooled essentially to the temperature of the salt water at the time the bed is first saturated. At this time, all of the residual heat remaining in his bed from he distillation process earlier carried on therein will have been recovered, and this retort-condenser chamber 10 can be effectively taken off stream by closing the valve 52, valves 42, 38, 46 and 34 having already been closed at a prior time during the operation of the system. Alternatively, the control valve 134 may be closed so that the entire quantity of recirculated, cold carrier gas is now directed through one of the pebble stoves 118 or 120. The distillation is now carried out in the second retort-condenser chamber 54 essentially as though it were the first of these units placed on stream. Thus, hot carrier gas is fed to the chamber 54 from one of the pebble stoves, and after it has picked up the condensed droplets of water is directed through the conduit 78 to the water recovery device 94. Recirculation of the carrier gas is then continued until all of the water is recovered from the bed of porous material in the chamber 54.

Of course, the advance of the thermal wave within the bed contained in the chamber 54 to the point where the necessary thermal gradient can no longer be obtained will occur in the same manner as has been described as characteristic of the porous bed of material in the chamber 10. It is therefore desirable to provide a third retort-condenser chamber which may at this time be employed in the same relation to the second retort-condenser chamber 54 as the latter chamber has previously been related earlier in the process with respect to the first chamber 10. When three of the retort-condenser chambers are used in this fashion, the first chamber 10 can conveniently be recharged and placed back on stream for series operation with the third chamber after the second chamber has been water-depleted, cooled and taken off stream in the manner described.

Charging of the retort-condenser chambers with new salt water adsorbing material is easily accomplished, of course, by merely lowering the lower portion of the respective chambers using the respective piston and cylinder assemblies which are provided for this purpose. When the depleted porous material from a previous run has been removed from the grade located within the respective chamber, the lower portion of this chamber is then elevated, a water seal established around the outside thereof, and fresh, porous substrate material charged to the chamber. The porous bed is then saturated with water and stripped of excessive water in the manner described. The unit is then ready to be placed back on stream in the proper sequence in the overall operation of the process as hereinbefore described.

It should be pointed out that in some instances, it is not necessary to replace the substrate material after each cycle. Rather, the same substrate material may be reused several times by merely recharging the solution or mixture to the substrate in the chamber preparatory to commencing the run. This procedure may be repeated until the substrate material becomes no longer capable of functioning as a repository for the salts and solid materials remaining thereon after liquid removal.

It is appropriate to point out here that a different structural arrangement which is capable of providing most of the advantages attributable to the alternating sequence operation of the plural retort-condenser chambers 10 and 54 is depicted in FIG. 2 of the drawings. Here a large distillation chamber 140 is provided and includes an upper portion 142 and a lower or bottom portion 144 which can be quickly disconnected from the upper portion 142 to permit the porous substrate materials to be removed when they are depleted, and to thus facilitate recharging of the distillation chamber. Extending from the lowest point in the lower portion 144 of the distillation chamber 140 is a water discharge pipe 146 containing a control valve 148. A material supporting perforate grate 150 extends transversely across the lower end of the upper portion 142 of the distillation chamber 140 for supporting a secondary bed 152 of porous material thereon. An upper grate 154, which is also perforated to permit gas and water flow therethrough, is spaced above the grate 150 within the distillation chamber 140 and supports a primary bed 156 of porous material.

Extending into the lower end portion of the distillation chamber 140 below the grate 150 is a cool carrier gas charging conduit 158 which contains a control valve 160. Similarly, a hot carrier gas charging conduit 162 containing a control valve 164 communicates with the interior of the distillation chamber 140 at a point above the secondary bed 152 of porous material, and just below the grate 154. At the upper end of the distillation chamber 140 there are provided a main effluent discharge conduit 166 containing a control valve 168 and a purge gas conduit 174 containing a control valve 176. An opening at the upper end of the distillation chamber is closed by a cover plate 178.

In the arrangement of the apparatus depicted in FIG. 2, the process is commenced by placing within the upper portion of the distillation chamber 140 on the grate 154, a gas traversable porous material of the type which has been discussed to form the primary bed 156. The porous material in the primary bed 156 is then saturated with sea water which can be introduced through the open upper end of the distillation chamber 140 when the cover plate 178 is removed.

After this, the cover plate 178 is closed, and purge gas is directed into the distillation chamber 140 from the purge gas conduit 174 while the control valves 168, 164 and 160 are closed. The valve 148 in the water drain pipe 146 is opened to permit excess water to be removed from the distillation chamber 140. After purging the particulate porous material in the bed 156, the control valve 176 is closed, as is the valve 148 in the water discharge pipe 146 and the control valve 168 in the main carrier gas effluent conduit is opened. The control valve 164 is opened, and hot carrier gas which has been preheated in a pebble stove, or any suitable heating device, is then directed through the carrier gas charging conduit 162 into the distillation chamber 140. As the hot carrier gas flows through the primary bed 156, it vaporizes water adsorbed on the particles adjacent the gate 154 and carries the steam upwardly in the bed to a point of lower temperature where water particles are condensed in very fine droplets which remain entrained in the carrier gas stream. After the hot carrier gas has traversed the bed 156 of paticulate material, the carrier gas, with the fine droplets of water entrained therein, is dicharged from the chamber 140 in the main carrier gas effluent conduit 166. This conduit is connected to a liquid recovery device (not shown) similar to that depicted in FIG. 1 and there designated by reference numeral 94. The conduit 166 thus corresponds in its status to the main carrier gas effluent conduit 40 connected to the retort-condenser chamber 10 in the embodiment of the apparatus depicted in FIG. 1.

Operation in this manner is continued until the thermal wave has traversed the bed 156 to the point that the temperature of the effluent at 166 rises too high for efficient operation (if the temperature is allowed to rise too high, an inordinate burden will be placed on the liquid recovery device 94 for condensation and cooling). The temperature will have been elevated throughout the major portion of the bed 156 to substantially the same temperature as the preheated, incoming carrier gas. At this time, the grate 154 is dropped (it may be pivotally secured at one edge to the inside wall of the chamber) so as to permit the material in the bed 156 to fall downwardly in the distillation chamber 140 and come to rest on the lower grate 150, thus establishing the secondary bed 154 which is depleted of a substantial portion of its adsorbed water, but which retains a substantial amount of residual heat as a result of the passage of the hot carrier gas therethrough.

In FIG. 2, it is assumed that one primary water saturated bed has already been processed and depleted in the manner described, and has been dropped downwardly within the distillation chamber 140 to form a secondary bed 152 resting upon the grate 150. After establishing the secondary bed 152 of hot porous material in this manner, a new, primary bed of fresh porous material is located on the grate in the manner previously described, and is saturated with water. Preferably, where such procedure is possible, water saturation of the particles of porous material in the new primary bed 156 is, at this time, achieved in a manner which will avoid the necessity to purge the bed by the use of purge gas from the conduit 174. The reason for this is that if excessive water is contained on the particles in the primary bed 156, and must be purged therefrom by directing purge gas downwardly through this bed, the effect will be to waste or lose a portion of the residual heat contained in the secondary bed 152 as the cool excess water is forced downwardly through this bed by the purge gas. It is thus preferred to obtain maximum, but not excessive, saturation of the particles in the primary bed 156 at the time this bed is placed within the distillation chamber 140 where this is possible.

After the primary bed 156 has been placed within the distillation chamber 140 on the grate 154, and the secondary bed 152 is in position, operation of the unit is continued by continuing to charge a relatively small amount (in comparison with the amount charged at the outset of the procedure when only a primary bed of material 156 is present within the distillation chamber) of hot, preheated carrier gas to the distillation chamber via the hot carrier gas charging conduit 162. Simultaneously with the introduction of this preheated carrier gas to the distillation chamber 140, a portion of recirculated, cool carrier gas is introduced to the lower end of the distillation chamber 140 through the cool carrier gas conduit 158, the control valve 160 having been opened at this time. This cold portion of the recirculated carrier gas is derived from the water stripped effluent stream from the main carrier gas effluent conduit 166 in the manner which has been discussed in describing the operation of the embodiment of the invention shown in FIG. 1.

In other words, as the distillation chamber 140 is placed on stream and in operation in the manner now being described, the effluent carrier gas passing from the top of the distillation chamber through the conduit 166 is directed to a suitable water recovery device where the water droplets are scrubbed or taken out of the moving carrier gas stream, and the dry carrier gas is then pumped or moved by a suitable blower back toward the pebble stove or other preheating device. However, prior to reaching the preheating device, a portion of this cold carrier gas is split off and diverted through the conduit 158 to the lower end portion of distillation chamber 140. From this point, the cold carrier gas passes upwardly through the secondary bed 152 of porous material, and there absorbs a substantial portion of the residual heat and water remaining in this material. After traversing this bed this fraction of the recirculated carrier gas is merged or mixed with the incoming preheated carrier gas from the hot carrier gas charging conduit 162 and is passed into the primary bed 156.

After continuing to operate in this fashion until substantially all of the residual heat in the secondary bed 152 of particulate material has been absorbed by the cold carrier gas fraction, and little warming of this stream is obtained as a result of its traversal of this bed, the valve 160 may be closed and the entire recirculated carrier gas stream may be preheated and charged to the distillation chamber 140 through the hot carrier gas charging conduit 162. The secondary bed 152 may be dumped by lowering the lower portion 144 of the distillation chamber 140 and dropping the grate 150. Though it is generally desirable during this dumping to completely shut down the unit for the time required to discharge the secondary bed 152, such shutdown need not necessarily be the case if means is provided to at this time isolate the space above this bed from the space below it so that continued flow through the primary bed 156 of a necessary volume of preheated carrier gas can be maintained during this discharge. In many instances, however, it will be desirable to move the primary bed 156 downwardly in the distillation chamber 140 to a position on the grate 150 to thus become a secondary bed at about the time that the prior secondary bed 152 is ready to be dumped.

Although certain preferred embodiments of the invention have been herein described in order to provide an example of the manner in which the apparatus of the invention may be constructed, and the process of the invention conducted therein, it will be understood that many variations in arrangement and specific characteristics of structural elements, as well as in process steps, can be effected without departure from the basic principles of the invention. It is primarily essential that the described thermal wave with its inherent thermal gradient be established across the beds of saturated porous material so that vaporization of the liquid content of the material to be treated is obtained at the trailing edge of the wave (that is, adjacent that portion of the porous material first contacted by incoming carrier gas) and so that condensation in the form of very fine droplets occurs at the leading edge of the wave (or most nearly adjacent the opposite side of the bed of particulate material from that first contacted by the carrier gas). All changes and innovations which may be effected in the described apparatus and procedure without departure from the basic principles of the invention are deemed to be circumscribed by the spirit and scope of the invention, except as the same may be necessarily limited by the appended claims or reasonable equivalents thereof.

What is claimed is:

1. A method for recovering fresh water from impure aqueous solutions comprising:

positioning in the path of flow of a hot inert carrier gas having a temperature above the boiling point of water at the prevailing pressure, a mass comprising a bed of porous solid substrate particulate material having the aqueous solution adsorbed on substantially all of the expose particulate surfaces thereof, said mass of porous solid material having passageways therethrough which are substantially free of said aqueous solutions;

directing said heated carrier gas as a stream across said substrate surfaces and upwardly through said passageways at a velocity effective to vaporize water from the solutions and produce a thermal gradient upwardly through the continuing body of the porous mass with a relatively high temperature in the lower portion of the porous mass and a relatively low temperature in the upper portion thereof to entrain the water vapor where the solution is initially contacted by the hot carrier gas, and further effective to permit subsequent cooling of the carrier gas, by continued traversal in the upper portion of the porous bed of other of said substrate surfaces than those initially contacted, to a temperature at which at least a portion of the entrained water vapor as derived from the solution undergoes condensation to micro droplet form, which droplets of condensate remain entrained in the carrier gas stream; then removing said condensate droplets derived from said solution from the carrier gas stream after the carrier gas has completed traversal of said surfaces whereby the droplets of water condensate are accumulated and said carrier gas is separated from the accumulated water droplets.

2. The method defined in claim 1 wherein said solution is a part of sewage disposed on said substrate material.

3. The method defined in claim 1 wherein said solution is a saline aqueous solution.

4. The method defined in claim 3 wherein said carrier gas is air.

5. The method defined in claim 1 wherein said porous mass material comprises compacted porous particles of carbon.

6. The method defined in claim 3 wherein said carrier gas is heated to a temperature of at least 212° F.

7. The method defined in claim 1 and further characterized to include the steps of:

reheating said carrier gas following removal of entrained condensate therefrom and redirecting said reheated carrier gas across said substrate surfaces at said velocity; then removing entrained condensate from the reheated carrier gas after it has completed traversal of said surfaces; and continuously recirculating the carrier gas in the manner described in this claim until substantially all of the liquid in the admixture is removed from the substrate.

8. The method defined in claim 1 and further characterized to include the step of increasing the total surface area of said substrate material while said carrier gas is being directed thereacross so that, as the liquid of the admixture is vaporized and removed from the first portion of said substrate surfaces contacted by the carrier gas, additional admixture-carrying surface is made available for traversal by the carrier gas.

9. The method defined in claim 7 and further characterized to include the steps of:

removing from the path of flow of the hot carrier gas, a portion of said substrate material from which the liquid has been substantially entirely removed by vaporization; and directing at least a portion of said carrier gas, after removal of the entrained condensate therefrom, through said removed portion of the substrate material to accomplish at least a portion of said reheating of the carrier gas.

10. The method defined in claim 8 wherein said substrate material is a bed of porous material, and said increase in total surface area is effected by placing at least one additional bed of porous material carrying said admixture in the path of flow of said hot carrier gas and downstream from the porous material traversed by said carrier gas before said increase in total surface area.

11. The method defined in claim 10 and further characterized to include the steps of:

ceasing to direct said hot carrier gas through said first mentioned bed of porous material after a substantial portion of the liquid from said admixture has been removed from the porous material in said first bed; then directing relatively cool carrier gas from which said entrained condensate has been removed through said first mentioned bed to heat said relatively cool carrier gas; and directing the thus heated carrier gas from said first mentioned bed through at least one of said additional beds.

References Cited
UNITED STATES PATENTS

| | | | |
|---|---|---|---|
| 489,337 | 1/1893 | Spink | 203—49 X |
| 798,964 | 3/1905 | Hodges et al. | 203—10 |
| 2,473,737 | 6/1949 | Storment | 203—100 X |
| 2,705,697 | 4/1955 | Royster | 201—21 |
| 2,847,368 | 8/1958 | Worthington et al. | 203—10 X |
| 3,214,349 | 10/1965 | Kehoe et al. | 202—236 X |
| 3,242,975 | 3/1966 | Kogan | 165—2 |
| 3,345,272 | 10/1967 | Collins | 203—11 |

NORMAN YUDKOFF, Primary Examiner

F. E. DRUMMOND, Assistant Examiner

U.S. Cl. X.R.

159—5; 202—236; 203—49, 89